United States Patent [19]

Maeda

[11] Patent Number: 4,576,545

[45] Date of Patent: Mar. 18, 1986

[54] WRIST OF ROBOT

[75] Inventor: Kenji Maeda, Funabashi, Japan

[73] Assignee: Hitachi, Ltd., Tokyo, Japan

[21] Appl. No.: 503,142

[22] PCT Filed: Oct. 4, 1982

[86] PCT No.: PCT/JP82/00398

§ 371 Date: Jun. 7, 1983

§ 102(e) Date: Jun. 7, 1983

[87] PCT Pub. No.: WO83/01223

PCT Pub. Date: Apr. 14, 1983

[30] Foreign Application Priority Data

Oct. 7, 1981 [JP] Japan .................................. 56-158843

[51] Int. Cl.[4] .............................................. B25J 11/00
[52] U.S. Cl. ...................................... 414/735; 901/26; 901/29
[58] Field of Search ................... 414/4, 735; 901/26, 901/28, 29, 18

[56] References Cited

U.S. PATENT DOCUMENTS 3,572,807  3/1971  Haaker et al. ................... 901/36 X
3,985,238  10/1976 Nakura et al. ....................... 414/4 X
4,353,677  10/1982 Susnjara et al. ..................... 414/4 X
4,435,120  3/1984  Ikeda et al. ......................... 414/4 X

FOREIGN PATENT DOCUMENTS 0085307  8/1983  European Pat. Off. ............. 901/29
1481819  10/1969 Fed. Rep. of Germany ........ 901/26
2505239  11/1982 France ................................. 901/29
0073463  6/1977  Japan .................................... 901/26
0624788  8/1978  U.S.S.R. ............................... 901/26

Primary Examiner—Leslie J. Paperner
Assistant Examiner—Lyle Kim
Attorney, Agent, or Firm—Antonelli, Terry & Wands

[57]  ABSTRACT

A wrist of a robot attached to a forward end of an arm of the robot in such a manner that the wrist can be readily flexed along an arcuate path when necessary. To eliminate a need to provide oscillating motors at the joints of the wrists of the robot, a device is provided to transmit motive force for bending the wrist along an arcuate path to portions of the wrist corresponding to the joints, with the device including gears located inwardly of wrist frames of the wrist of the robot.

5 Claims, 4 Drawing Figures

FIG. 3
FIG. 4
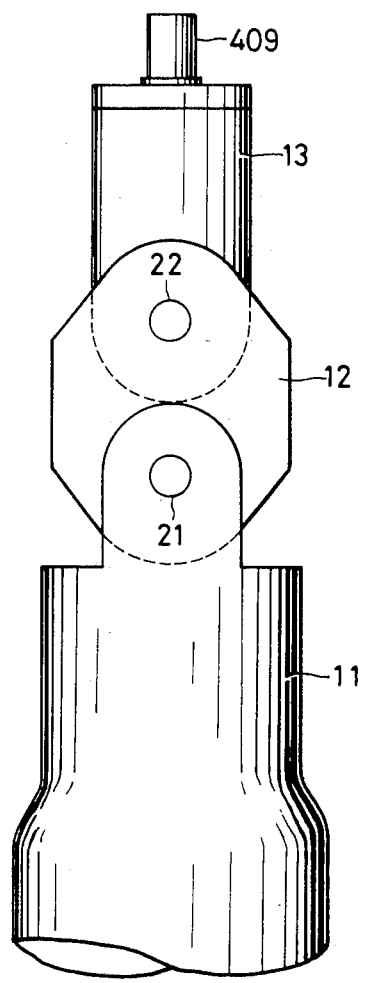
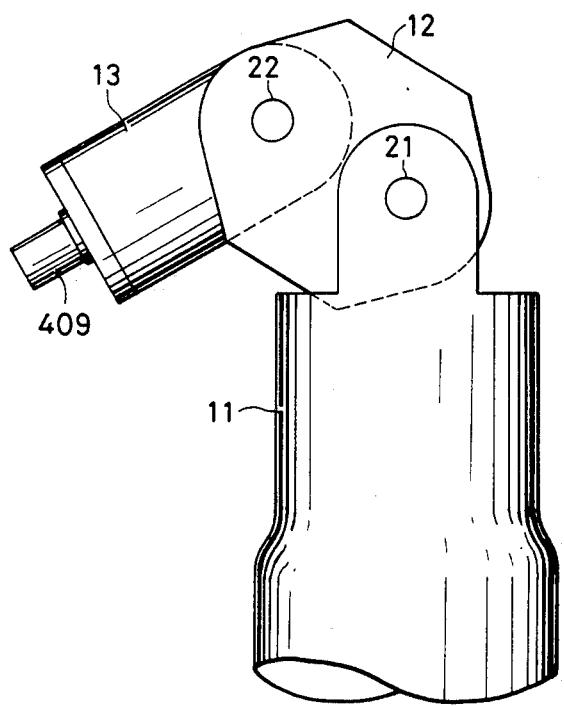

WRIST OF ROBOT

BACKGROUND OF THE INVENTION

This invention relates to a wrist of a robot fitted at a forward end of an arm thereof, which wrist can be flexed along an arcuate path when necessary.

To obtain flexing of a robot wrist along an arc, one only has to mount an oscillating motor at each of the joints located along the length of the wrist. However, disadvantages associated with this arrangement reside in the fact that pipes and wires connecting the oscillating motors to a drive source interfere with an operation of the wrist because they are located outside the wrist. Moreover, mounting the oscillating motors increases the size and weight of the wrist of the robot to the extent corresponding to those of the motors.

One of the objects of the present invention resides in the provision of a wrist of a robot of compact size and light weight which is free from the aforesaid disadvantages of the prior art. Another object of the present invention resides in protecting gears assembled with the wrist of the robot from external shocks. Other and additional objects, features and advantages of the invention will become apparent from the description set forth hereinafter.

This invention pertains to a wrist of a robot of the type in which motive force for obtaining flexing of the wrist along an arc is transmitted successively through portions of the wrist corresponding to joints thereof. In accordance with the invention, the motive force transmitting system includes a gearing of high reliability in performance in which gears are arranged to be disposed inwardly of wrist frames.

The wrist of the robot according to the invention comprises at least more than three wrist frames or first, second, third, . . . and nth wrist frames, with the first wrist frame being fitted to an arm of the robot, the second wrist frame being pivotally connected to the first wrist frame, and the third wrist frame being pivotally connected to the second wrist frame and, if possible, a fourth wrist frame being pivotally connected to the third wrist frame.

The first wrist frame comprises a main stationary gear in meashing engagement with an auxiliary stationary gear of the third wrist frame, with the main stationary gear of the first wrist frame being disposed inwardly of the first wrist frame as well as the second wrist frame. An auxiliary stationary gear, for example, of the second wrist frame is disposed inwardly of the first wrist frame, with a drive means, disposed inwardly of the first wrist frame, being connected to the auxiliary stationary gear of the second wrist frame. By transmitting motive force between the main stationary gears or the drive means and the auxiliary stationary gears, the wrist of the robot can be flexed as a whole along an arcuate path at the joints of the respective wrist frames.

BRIEF DESCRIPTION OF THE DRAWINGS

FIG. 3 is a side view of the wrist of the robot of FIG. 2; and

FIG. 4 is a front view of the wrist of the robot according to the invention in a condition in which it is flexed along an arc.

DETAILED DESCRIPTION

Figure 1:
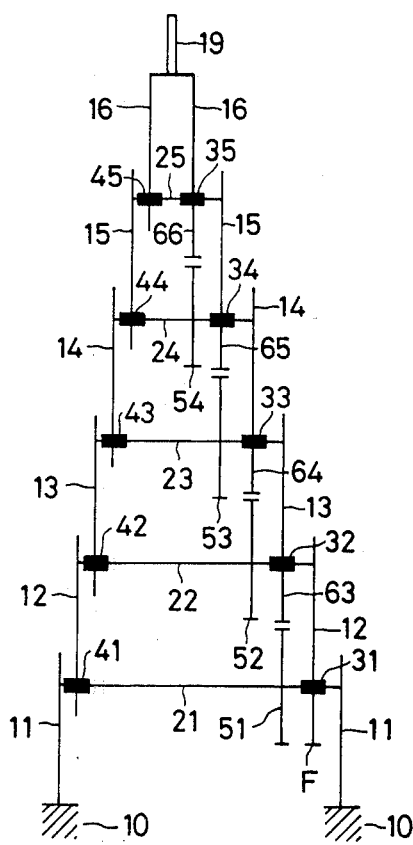
FIG. 1 is a schematic view of the concept on which the wrist of the robot according to the invention is based.

Referring now to the drawings wherein like reference numerals are used throughout the various views to designate like parts and, more particularly, to FIG. 1 according to this figure, a wrist of a robot according to the invention comprises more than three wrist frames or first, second, third, fourth, fifth and sixth wrist frames 11, 12, 13, 15, and 16, respectively, with the wrist frames 11–16 forming a framework of the wrist for housing gears and the like in an interior thereof. Preferably, the wrist frames 11–16 are each in cylindrical form. However, they may each be formed, instead, of a pair of plates in spaced juxtaposed relation which are rendered unitary in, for example, a U-shaped configuration because such structure would be enough to provide a protection to the gears and the like inside the framework. The first wrist frame 11 of a foremost stage is fitted to a forward end of an arm 10 of the robot. When they are rigidly connected together, the first wrist frame 11 may be considered to be a part of the arm 10. However, in order to increase the degrees of freedom, the first wrist frame 11 is preferably connected to the arm 10 in such manner that the wrist frame 11 is capable of moving in swinging movement with respect to the latter.

The second wrist frame 12 located at a stage following the foremost stage is pivotally connected to the first wrist frame 11 of the foremost stage. The pivotal connection between the second and first wrist frames 12, 11 which is different from the swinging connection between the first wrist frame 11 and the arm 10 described hereinabove, is of such a degree that an intersection angle between the first and second wrist frames 11, 12 can be varied. The second wrist frame 12 moves in pivotal movement along a pivot axle 21 while being supported in two positions, with portions 31, 41 of the pivot axis 21 serving as bearings. Preferably the pivot axis 21 is a single entity to facilitate assembling. However, the pivot axis 21 may comprise a pair of sections located on the left and right, while the central portion of the pivot axis 21 may be ommitted. The wrist frames 13, 14, 15 and 16, located at the successively following stages after the second stage at which the second wrist frame 12 is located, are pivotally connected to the respective wrist frames 12, 13, 14 and 15 located at the successively preceding states before the sixth wrist frame 16 with the respective wrist frames 12, 13, 14, 15 being pivotable along pivot axes 22, 23, 24 and 25 respectively having portions 32, 42, 33, 43, 34, 44, 35 and 45 serving as bearings.

The wrist frames 11–16 can move in pivotal movement between the adjacent wrist frames 11–16 with the number of positions in which the wrist frames 11–16 move in pivotal movement or the number of joints being less by one than a total number of the wrist frames 11–16. In the invention, it is for the purpose of providing more than two joints that the number of wrist frames is more than three and, for example, if only one joint were provided, it would be impossible to bend the wrist along an arcuate path, much less to enable the wrist to perform a necessary operation by moving around an obstacle.

With the exception of the two wrist frames of the rearmost stage or the sixth and fifth wrist frames 16, 15, the first to the fourth wrist frames 11–14 are provided with main stationary gears 51, 52, 53, 54, respectively. For example, the main stationary gear 51, affixed to the first wrist frame 11, is disposed inwardly thereof and inwardly of the second wrist frame 12 of the next following stage. This arrangement is the same with other main stationary gears 52–54. Also, the main stationary gear 51 affixed to the first wrist frame 11, for example, is located coaxially with the pivot axis 21 for the second wrist frame 12 of the next following stage to move in pivotal movement. This arrangement is the same with other main stationary gears 52–54.

The main stationary gear 51 affixed to the first wrist frame 11, for example, is in meshing engagement, inwardly of the second wrist frame 12 of the next following stage, with an auxiliary stationary geary gear 63 affixed to the third wrist frame 13 of the third stage. This arrangement is the same with other main stationary gears 52–54. The fourth to the sixth wrist frames 14–16 have auxiliary stationary gears 64, 65 and 66 respectively affixed thereto. The auxiliary stationary gear 63, for example, is located concentrically with the pivot axis 22 supporting for pivotal movement the third wrist frame 13 to which the auxiliary stationary gear 63 is affixed. This arrangement is the same with other auxiliary stationary gears 64–66. In FIG. 1, the auxiliary stationary gears 63–66 are shown as being unitary with the third to the sixth wrist frames 13–16 respectively. However, for practical purposes, the auxiliary stationary gears 63–66 and the third to the sixth wrist frames 13–16 are preferably formed as separate entities with the former located inwardly of the latter. The main stationary gears 51–54 and auxiliary stationary gears 63–66 need not be in the form of a circle that allows one complete revolution through 360° to be made, and they may be in, for example, segmental form. The main stationary gears 51–54 are in direct meshing engagement with the auxiliary stationary gears 63–66 respectively. However, two intermediate gears may be interposed between each pair of main stationary gears and the auxiliary stationary gear so that they will be in indirect meshing engagement with each other through the intermediate gears.

In the wrist of the robot shown in FIG. 1, assume that an output of a drive means, not shown, located inwardly of the first wrist frame 11 is caused to act on a position ? to move the second wrist frame 12 in pivotal movement with respect to the first wrist frame 11. The pivotal movement of the second wrist frame 12 causes a change to occur in the position of the pivot axis 22. The auxiliary stationary gear 63 becomes a planet gear which revolves round the main stationary gear 51. The third wrist frame 13 affixed to the auxiliary stationary gear 63 moves in pivotal movement. Likewise, the fourth to the sixth wrist frames 14–16 pivotally move in the same direction as described hereinabove with respect to the wrist frames 13–15 of the preceding stages. As a result, the wrist of the robot as a whole is flexed in the form of an arc. The motive force necessary to obtain the aforesaid flexing movement of the wrist is successively transmitted to the wrist frames 12–16 largely through the main stationary gears 51–54 and the auxiliary stationary gears 63–66. This eliminates the need to provide each of the wrist frames 12–16 with a specific drive source or motive force transmitting means that would take the place of the drive source. The flexing movement of the wrist which takes place along an arc, as described hereinabove, corresponds to one of a plurality of degrees of freedom possessed by the robot as a whole and makes it possible to move an arbitrarily selected working member 19 attached to the sixth wrist frame 16 of the final stage to perform a desired operation. The operations that can be performed by the aforesaid flexing movement of the wrist of the robot may include painting, welding, assembling, etc.

The wrist of the robot shown in FIG. 1 convergingly tapers from the rearward end toward the forward end or is pyramidal in shape, and the wrist frames 11–16 become increasingly thinner in going from the first stage to the last stage. This structural relationship is obtained by virtue of the fact that the main stationary gear 51 and the auxiliary stationary gear 63 connected together in a line are located leftwardly of the first and the second wrist frames 11 and 13, and the main stationary gear 52 and the auxiliary stationary gear 64 connected together in a line are located further leftwardly of the main stationary gear 51 and the auxiliary stationary gear 63. In any case, the wrist frames 11–16 are located on the outer side to provide an outer framework of the wrist of the robot. For practical purposes, it is desirable that a cover, disposed in enclosing relation to the wrist of the robot be provided. However, such cover should be pliable, like bellows, so that it can easily be deformed along the wrist as the latter is flexed. Such cover would be soft and weak and could offer no resistance when the wrist impinges on an external obstacle. It is the wrist frames 11–16 that have a shock of collision applied thereto. Thus, the wrist frames 11–16 are each required to have a width large enough to provide a cover to opposite plate surfaces of the associated ones of the main stationary gears 51–54 and the auxiliary stationary gears 63–66.

As described above, the wrist of the robot shown in FIG. 1 is convergingly tapering, however, the shape of the wrist may be modified in the following manner. For example, the sixth wrist frame 16 may have a left side plate disposed leftwardly of a left side plate of the wrist frame 15 of the preceding stage and the left side plates of the two wrist frames 16 and 15 may be pivotally connected together. Such modification can be readily effected if the sixth wrist frame 16 has an inverted U-shaped configuration with an open bottom.

Figure 2:
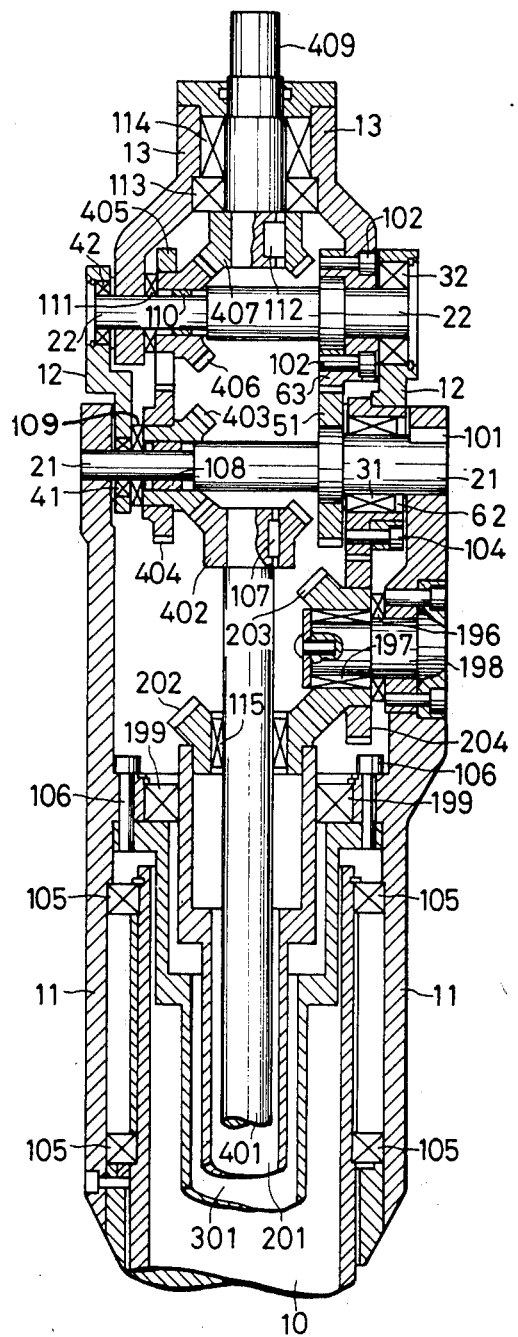
FIG. 2 is a sectional front view of a first embodiment of a wrist of a robot constructed in accordance with the invention.

In FIGS. 2–4, the first to the third wrist frames 11–13 are an essential minimum number if wrist frames, with the third wrist frame 13 representing the final stage. The third wrist frame 13 and the second wrist frame 12 are disposed on the final stage side and provided with no main stationary gears, and only the first wrist frame 11 is provided with the main stationary gear 51 affixed thereto. The wrist frames 11–13 are each cylindrical in shape, but their peripheral edges are of special shape to allow pivotal movement to take place between the adjacent wrist frames.

A key 101 is provided for avoiding recoiling of the pivot axis 21 to which the main stationary gear 51 is affixed. The auxiliary stationary gear 63 is secured to an inner side of the third wrist frame 13 by bolts 102. The gear ratio of the main stationary gear 51 and the auxiliary stationary gear 63 is one, so that the pivoting angle between the wrist frames 11, 12 and the pivoting angle between the wrist frames 12, 13 always agree with each other. The reason why the gear ratio is set at one is because it is desired to enable both the second wrist frame 12 and the second wrist frame 13 to move in full pivotal movement within limits with respect to the wrist frames of the preceding stages. The limit of the pivotal movement is about 60°.

A drive means, located inwardly of the first wrist frame 11 drives the second wrist frame 12 to move in a pivotal movement, with the drive means comprising a pivoting drive shaft 201, a bevel gear 202 secured to the pivoting drive shaft 201, another bevel gear 203 meshing with the bevel gear 202 and a spur gear 204 coupled to the bevel gear 203. A pin 198 supports the bevel gear 203, with a bearing 199 being provided between the first wrist frame 11 and the pivoting drive shaft 201, and with bearings 196, 197 being disposed at the pin 198. A spur gear 62 is mounted on the pivot axis 21 through the bearing 31 and is bolted or secured at 104 to an inner side of the second wrist frame 12 while meshing with the spur gear 204. When the pivoting drive shaft 201 is driven, motive force is transmitted from the shaft 201 to the second wrist frame 12 through the gears 202, 203, 204 and 62 to move the second wrist frame 12 in pivotal movement. This also simultaneously moves the third wrist frame 13 in a pivotal movement.

The first wrist frame 11 is attached to an outer peripheral portion of an end of the arm 10 of the robot for swinging movement. A bearing 105 enables the first wrist frame 11 to move in a rotating movement. Swinging drive means is located inside the arm 10 and comprises a drive shaft 301 secured at its forward end portion through bolts 106. By virtue of this arrangement, the wrist of the robot as a whole as well as the first wrist frame 11 moves in a rotating movement when the drive shaft 301 rotates. Thus, the robot is given with one other degree of freedom in addition to the degree of freedom given thereto by the pivotal movement of the wrist frames.

A rotary shaft 409, journalled by bearings 113 and 114, is mounted in a central position of the third wrist frame 13 of the final stage, and a drive shaft 401 is mounted on the first wrist frame 11 through a bearing 115 and has a bevel gear 402 secured to its forward end. A key 107 prevents rotation of the bevel gear 402 relative to the shaft 401. Another bevel gear 403 meshes with the bevel gear 402 and is coupled to a spur gear 404. The bevel gear 403 and spur gear 404 function as intermediate gears and are located concentrically with the pivot axis 21 for moving the second wrist frame 12 in a pivotal movement. Bearings 108 and 109 support the bevel gear 403, and the spur gear 404 meshes with another spur gear 405 coupled to still another bevel gear 406 supported by bearings 110, 111. The spur gear 405 and bevel gear 406 which also function as intermediate gears are located concentrically with the pivot axis 22 for moving the third wrist frame 13 in pivotal movement, and the bevel gear 406 meshing with a further bevel gear 407 which is secured to a lower end portion of the rotary shaft 409 through a key 112 for preventing rotation of the bevel gear 407 relative to the shaft 409. When the drive shaft 401 is driven, rotational force of the shaft 401 is transmitted to the rotary shaft 409 through the gears 402, 403, 404, 405, 406 and 407 to rotate the same. This causes a working member, not shown, secured to the rotary shaft 409 to rotate. Rotation of the rotary shaft 409 represent one other degree of freedom in addition to the degrees of freedom represented by the pivoting movement and the rotational movement described hereinabove. Thus, the wrist of the robot of this embodiment has three degrees of freedom.

The intermediate gears 404 and 405 have a gear ratio which is the same as the gear ratio of the main stationary gear 51 and the auxiliary stationary gear 63 corresponding thereto. The significance of this agreement in gear ratio will be discussed by assuming that the rotation drive shaft 401 remains inoperative while the drive shaft 201 rotates. When the shafts 401, 201 are in this condition, the auxiliary stationary gear 63 rotates on its own axis while revolving round the main stationary gear 51. Since the gear ratios of the main and auxiliary stationary gears 51, 63 and the intermediate gears 404, 405 are equal to each other, the intermediate gear 405 also rotates on its own axis while revolving around the intermediate gear 404. This prevents the intermediate gear 405 from rotating with respect to the auxiliary stationary gear 63 and the third wrist frame 13, thereby preventing the rotary shaft 409 from rotating. Thus, the influence which would otherwise be exerted on the rotary shaft 409 by the pivoting movements of the second and third wrist frames 12 and 13 can be eliminated, thereby enabling control of the rotation of the rotary shaft 409 to be effected separately and independently by means of the rotation drive shaft 401.

Assume that in FIG. 2 the wrist of the robot extending in an upward and downward direction and in a leftward and rightward direction extends along a vertical axis and a horizontal axis respectively. The pivoting movements of the second wrist frame 12 and the third wrist frame 13 are movements oriented in the direction of the horizontal axis. The pivoting drive shaft 201 for obtaining the pivoting movements of the second wrist frame 12 and the third wrist frame 13 is arranged in the direction of the vertical axis through the pair of bevel gears 202, 203. This structural relationship is provided to make the wrist frames 11–13, particularly the first wrist frame 11, as thin as possible. The drive shaft 201 is located concentrically with the drive shaft 301 and the rotation drive shaft 401, and the shafts 201, 301 and 401 are arranged to extend along the vertical axis. This structural relationship is intended to achieve the same effect as described hereinabove. The drive shaft 301 is located outside the shafts 401 and 201 because it only has to transmit its force to the first wrist frame 11. The reason why the drive shaft 401 is located inside the shafts 301, 201 is because it is necessary to transmit force from the shaft 401 to the rotary shaft 409 for the third wrist frame 13. The reason why the pivoting drive shaft 201 is located between the shafts 301, 401 is because it is necessary to transmit force from the shaft 201 to the second wrist frame 12 interposed between the first wrist frame 11 and the third wrist frame 13.

What is claimed is:

1. A wrist of a robot comprising at least a first wrist frame, a second wrist frame, and a nth wrist frame, characterized in that:

the first wrist frame of a first stage is attached to an arm of the robot;

the second wrist frame, located at a stage following that of the first wrist frame, is supported for pivotal movement with respect to the first wrist frame in such a manner that the intersection angle between the first wrist frame and the second wrist frame can be varied;

the nth wrist frame, located at a stage following that of the second wrist frame, is supported for pivotal movement with respect to the second wrist frame in such a manner that the intersection angle between the second wrist frame and the nth wrist frame can be varies;

a main stationary gear is affixed to the first wrist frame, said main stationary gear being disposed inwardly of the first wrist frame to which it is affixed and also inwardly of the second wrist frame, said main stationary gear being arranged concentrically with a first pivot axis for moving the second wrist frame of the next following stage in pivotal movement, and said main stationary gear being in meshing engagement, in a position inwardly of the second wrist frame, with an auxiliary stationary gear affixed to the nth wrist frame, said auxiliary stationary gear being arranged coaxially with a second pivot axis for pivotally moving the nth wrist frame to which said auxiliary stationary gear is affixed;

drive means for driving said second wrist frame to move in pivotal movement, said drive means being located inwardly of the first wrist frame;

said wrist frame at the first stage is connected to the arm of the robot in such a manner that the first wrist frame is moved in a rotating movement with respect to the arm of the robot by drive means located inside the arm; and an output shaft of said drive means for pivotally driving the second wrist frame and an output shaft of said drive means for driving the first wrist frame to move in a rotating movement are located coaxially with respect to each other.

2. A wrist of a robot comprising at least a first wrist frame, a second wrist frame, and a nth wrist frame, haracterized in that:

the first wrist frame of a first stage is attached to an arm of the robot;

the second wrist frame, located at a stage following that of the first wrist frame, is supported for pivotal movement with respect to the first wrist frame in such a manner that the inner section angle between the first wrist frame and the second wrist frame can be varied;

the nth wrist frame, located at a stage following that of the second wrist frame, is supported for pivotal movement with respect to the second wrist frame in such a manner that the intersection angle between the second wrist frame and the nth wrist frame can be varied;

a main stationary gear is affixed to the first wrist frame, said main stationary gear being disposed inwardly of the first wrist frame to which it is affixed and also inwardly of the second wrist frame, said main stationary gear being arranged concentrically with a first pivot axis for moving the second wrist frame in pivotal movement, and said main stationary gear being in meshing engagement, in a position inwardly of the second wrist frame, with an auxiliary stationary gear affixed to the nth wrist frame, said auxiliary stationary gear being arranged coaxially with a second pivot axis for pivotally moving the nth wrist frame to which said auxiliary stationary gear is affixed;

drive means for driving said second wrist frame, to move in pivotal movement, is located inwardly of the first wrist frame; drive means for driving a drive shaft;

said drive shaft is mounted on the wrist frame of the nth stage; a first intermediate gear is located coaxially with the first pivot axis;

a second intermediate gear is located coaxially with the second pivot axis for transmitting rotary force to the drive shaft; and said first intermediate gear is connected with another intermediate gear disposed coaxially to the first pivot axis, and a further intermediate gear is connected to said second intermediate gear and is disposed coaxially to the second pivot axis said another intermediate gear is in meshing engagement with said further intermediate gear whereby rotary force to said shaft is transmitted through said intermediate gears.

3. A wrist of a robot as claimed in claim 2, characterized in that said another intermediate gear and said further intermediate gear have a gear ratio which is the same as a gear ratio of the main stationary gear and the auxiliary gear.

4. A wrist of a robot as claimed in claim 3, characterized in that said gear ratio is one.

5. A wrist of a robot as claimed in claim 2, characterized in that an output shaft of the drive means for driving the second wrist frame to move in pivotal movement and an output shaft of drive means for imparting rotary force to said intermediate gears are arranged coaxially within the first wrist frame.

* * * * *